Patented May 14, 1940

2,200,478

UNITED STATES PATENT OFFICE 2,200,478

MANUFACTURE OF ANTIMONY TRIOXIDE PIGMENTS

Kurt Schirrmeister, Leverkusen-Wiesdorf, Germany, assignor to I. G. Farbenindustrie Aktiengesellschaft, Frankfort-on-the-Main, Germany No Drawing. Application February 2, 1939, Serial No. 254,236. In Germany February 16, 1938

9 Claims. (Cl. 23—144)

This invention relates to a process of preparing antimony trioxide pigments.

Antimony trioxide generally is prepared, especially for pigment purposes, according to the sublimation process, whereby antimony metal or some of its compounds are burnt in an oxidizing atmosphere and the subliming antimony trioxide is collected in apparatus suitable for this process.

Moreover antimony trioxide can be obtained from a number of antimony salts, for instance from antimony trichloride or antimony trisulfate by hydrolyzing these compounds and then treating the products resulting from the hydrolysis with a sodium carbonate solution. By the reaction of organic antimony salts, for instance, tartar emetic solution, with sulfuric acid or with ammonia, antimony trioxide also may be prepared.

It often has been tried to utilize the antimony trioxide obtained according to the above-named wet processes as pigment. But this product has many disadvantages; it has a very poor covering and a bad coloring power; often it can only with difficulty be made into a paste with oil and sometimes it contains a rather large amount of salts, originating from the manufacture, and these salts only difficultly can be removed.

According to the present invention I have found that by reaction of antimony trifluoride with alkaline reacting compounds an antimony trioxide can be prepared which as to its pigment qualities in the least is equal to the products obtained by sublimation, especially with reference to their covering power, whiteness and to the ease of being ground with oil. The antimony trifluoride is employed in aqueous solutions. As alkaline reacting compounds for instance alkali metal or ammonium hydroxides, alkali metal or ammonium carbonates or bicarbonates and also organic bases come into consideration. These compounds too are preferably employed in aqueous solutions. The reaction is advantageously carried out while thoroughly mixing both the initial solutions. The precipitate obtained in the double decomposition is filtered, washed and dried.

The solutions of the alkali metal and ammonium hydroxides, carbonates and bicarbonates are preferably employed in a slight excess, to avoid a loss of antimony trifluoride. But it is also possible to work with an excess of antimony trifluoride without impairing the pigment qualities.

The concentration of the solutions employed is of importance in so far as when using dilute solutions an antimony trioxide is obtained which after having been ground with oil shows a bluish tone, while with concentrated solutions products are obtained which after having been ground with oil show a gray tone.

Consequently when varying the proportions of concentration each desired shade or tone can be obtained whereby the concentration of the hydroxide-, carbonate- or bicarbonate-solution is of greater importance than that of the antimony trifluoride solution.

The fluoride solution may be added to the hydroxide-, carbonate- or bicarbonate-solution or vice versa.

The precipitation can be performed at any temperature; if the temperature is increased above room temperature the tone of the products ground with oil turns to gray.

The reaction between the two solutions is finished shortly after mixing, but it is recommendable to further stir for ½ to 1 hour.

The precipitates are filtered, washed and then dried at a temperature of about 100° C.

The filtrates may be worked up to fluorides. The solutions requisite for the double decompositions have to be carefully purified. They are produced according to known processes. The antimony trifluoride solution, for instance, can be obtained by dissolution of pure antimony trioxide in pure hydrofluoric acid. The purification of the alkaline solutions, such as the caustic alkali or alkali metal carbonate solutions equally is effected according to known processes.

Example 1

35 ccms. of an antimony trifluoride solution, containing 800 grs. of $SbF_3$ per liter are added while stirring to 2 liters of a 5% sodium carbonate solution (at room temperature). The mixture is stirred for half an hour, then the precipitate is filtered off, washed and dried at 95° C.

Example 2

60 grs. of sodium carbonate are dissolved in 6 liters of water. 42 ccms. of an antimony trifluoride solution, containing 800 grs. of $SbF_3$ per liter, are added at room temperature to the sodium carbonate solution while stirring. The further working up is performed as described in Example 1. The product obtained shows after having been ground with oil a blue tone.

Example 3

140 grs. of potassium carbonate are dissolved in 1 liter of water. 70 ccms. of an antimony trifluoride solution, containing 800 grs. of $SbF_3$ per liter are added at room temperature to the potassium carbonate solution. The further working up is performed as described in Example 1. The product obtained shows after having been ground with oil a gray tone.

Example 4

100 grs. of sodium carbonate are dissolved in 1.2 liters of water. 560 ccms. of an antimony trifluoride solution, containing 100 grs. of $SbF_3$ per liter are added at room temperature to the sodium carbonate solution while stirring. The further working up is performed as described in Example 1. The product obtained shows after having been ground with oil a gray tone.

Example 5

40 grs. of sodium carbonate are dissolved in 4 liters of water. The solution is heated to 90° C. 42 ccms. of an antimony trifluoride solution containing 800 grs. of $SbF_3$ per liter are added at this temperature while stirring. The further working up is performed as described in Example 1.

Example 6

50 grs. of sodium hydroxide are dissolved in 1 liter of water. 200 ccms. of an antimony trifluoride solution, containing 335 grs. of $SbF_3$ per liter are added to the sodium hydroxide solution while stirring. The further working up is performed as described in Example 1.

Example 7

84 ccms. of an antimony trifluoride solution, containing 800 grs. of $SbF_3$ per liter, are added to 72 grs. of ammonium carbonate, and dissolved in 2 liters of water. The further working up is performed as described in Example 1.

Example 8

An antimony trifluoride solution of any concentration is added to a 2% sodium carbonate solution in such an amount that the reaction mixture is distinctly acid at the end of the precipitation process. The excess of antimony trifluoride can be precipitated in the filtrate with caustic alkali solution or alkali metal carbonate solution. The further working up is performed as described in Example 1.

Example 9

3350 ccms. of a 2% sodium carbonate solution are added to 63 ccms. of an antimony trifluoride solution, containing 800 grs. of $SbF_3$ per liter. The further working up is performed as described in Example 1.

Example 10

A solution of 35 grs. of antimony trifluoride dissolved in 50 ccms. of water is mixed at room temperature while stirring with a solution of 60 grs. of sodium bicarbonate, dissolved in 2 liters of water. The precipitate is washed, filtered and dried.

Example 11

A solution of 35 grs. of antimony trifluoride in 50 ccms. of water is mixed at room temperature while stirring with a solution of 60 grs. of ammonium carbonate in 2 liters of water. The precipitate is washed, filtered and dried.

Example 12

100 grs. of an aqueous 25% methyl amine solution are mixed while stirring with 50 ccms. of a 45% antimony trifluoride solution. The precipitate obtained is filtered, washed and dried.

Example 13

20 grs. of benzyl amine are dissolved in 1 liter of water. 12 ccms. of a 45% $SbF_3$ solution are added while stirring. The precipitate is filtered, washed and dried.

I claim:

1. Process of preparing antimony trioxide pigments which comprises precipitating antimony trioxide from an antimony trifluoride solution by means of an alkaline reacting compound, separating the precipitate from the solution, washing and drying.

2. Process of preparing antimony trioxide pigments which comprises precipitating antimony trioxide from an aqueous antimony trifluoride solution by means of an aqueous solution of an alkaline reacting compound, separating the precipitate from the solution, washing and drying.

3. Process of preparing antimony trioxide pigments which comprises precipitating antimony trioxide from an aqueous antimony trifluoride solution by means of an aqueous solution of an inorganic alkaline reacting compound, separating the precipitate from the solution, washing and drying.

4. Process of preparing antimony trioxide pigments which comprises precipitating antimony trioxide from an aqueous antimony trifluoride solution by means of an aqueous solution of an inorganic alkaline reacting compound of the group consisting of alkali metal and ammonium hydroxides, carbonates and bicarbonates, separating the precipitate from the solution, washing and drying.

5. Process of preparing antimony trioxide pigments which comprises precipitating antimony trioxide from an aqueous antimony trifluoride solution by means of an aqueous solution of an alkali metal carbonate, separating the precipitate from the solution, washing and drying.

6. Process of preparing antimony trioxide pigments which comprises precipitating antimony trioxide from an aqueous antimony trifluoride solution by means of an aqueous solution of sodium carbonate, separating the precipitate from the solution, washing and drying.

7. Process of preparing antimony trioxide pigments which comprises precipitating antimony trioxide from an aqueous antimony trifluoride solution by means of an organic alkaline reacting compound, separating the precipitate from the solution, washing and drying.

8. Process of preparing antimony trioxide pigments which comprises precipitating antimony trioxide from an aqueous antimony trifluoride solution by means of an organic base, separating the precipitate from the solution, washing and drying.

9. Process of preparing antimony trioxide pigments which comprises precipitating antimony trioxide from an aqueous antimony trifluoride solution by means of methyl-amine, separating the precipitate from the solution, washing and drying.

KURT SCHIRRMEISTER.